C. H. COPP.
DRAFTLESS TRUCK.
APPLICATION FILED MAR. 7, 1922.
1,438,901.
Patented Dec. 12, 1922.
2 SHEETS—SHEET 2.
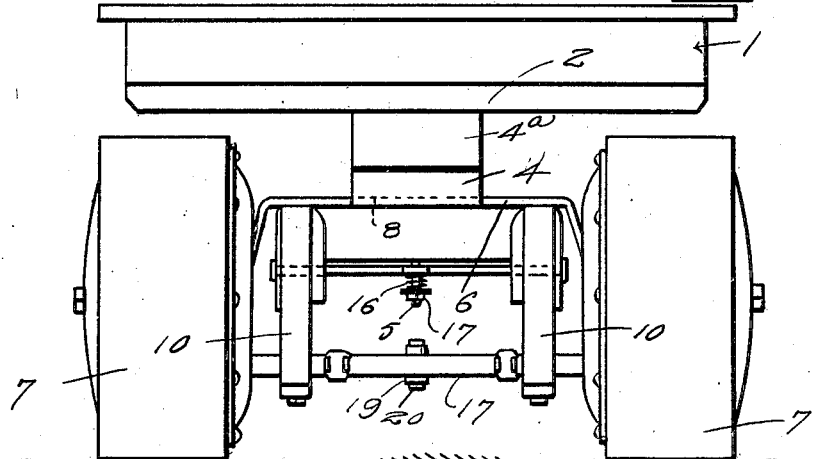
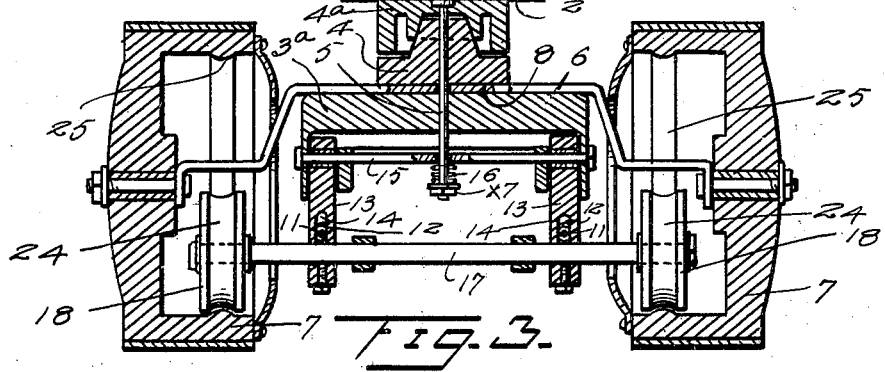
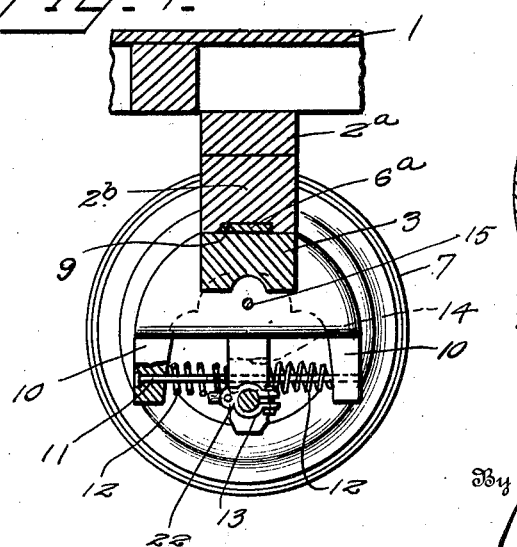
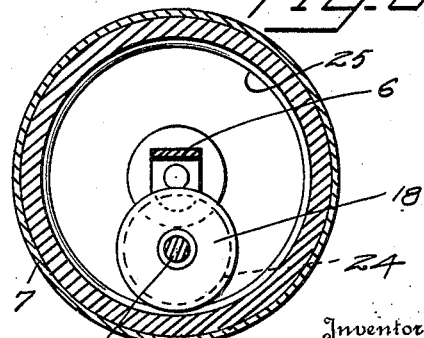
Inventor
C. H. Copp Patented Dec. 12, 1922.

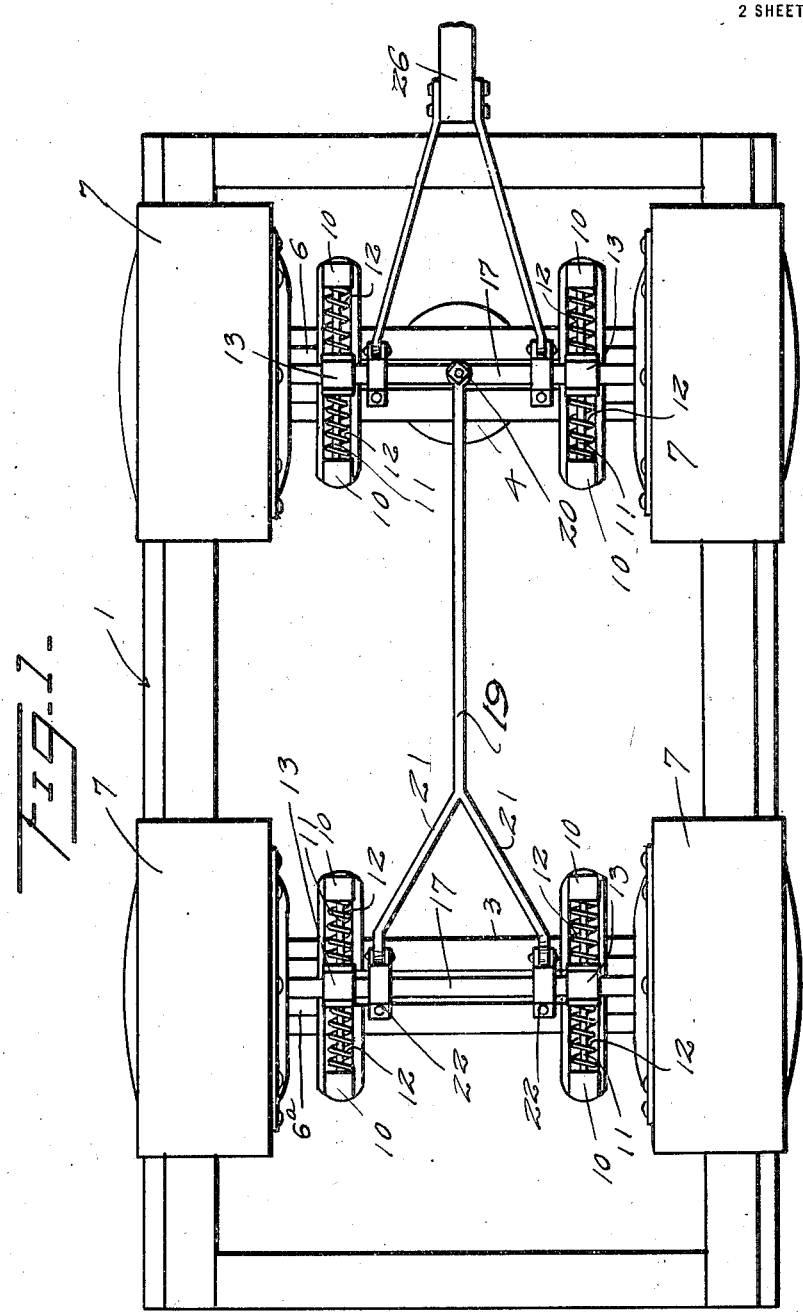

1,438,901

UNITED STATES PATENT OFFICE.

CHARLES H. COPP, OF ELBERTA, MICHIGAN.

DRAFTLESS TRUCK.

Application filed March 7, 1922. Serial No. 541,702.

*To all whom it may concern:*

Be it known that I, CHARLES H. COPP, a citizen of the United States, residing at Elberta, in the county of Benzie and State of Michigan, have invented certain new and useful Improvements in Draftless Trucks; and I do hereby declare the following to be a full, clear, and exact description of the invention, such as will enable others skilled in the art to which it appertains to make and use the same.

This invention relates to new and useful improvements in trucks and more particularly to running gears therefor and has for its primary object the provision of means whereby the draft power may be delivered to the fellies of the wheels beyond the vertical axes of the latter to aid in rotating the wheels and consequently reduce the amount of draft power necessary to move the truck as compared to another truck of the same weight wherein the draft power is delivered to the axles or in the customary manner to the truck.

Another object of this invention is the provision of a truck of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a bottom plan view illustrating a truck constructed in accordance with my invention, Figure 2 is a front elevation illustrating the same, Figure 3 is a transverse sectional view illustrating one of the axle frames supporting the axle with the wheels thereon, Figure 4 is a view partly in longitudinal section and partly in elevation illustrating the rear wheel connection, Figure 5 is a detail sectional view illustrating one of the wheels.

Referring in detail to the drawings, 1 indicates a truck body provided with front and rear bolsters 2 and $2^a$, respectively, to which are attached front and rear axle frames. The rear axle frame or beam is designated 3 and is rigidly secured to a beam $2^b$ which is in turn secured to the rear bolster $2^a$. The front axle frame or beam is designated $3^a$ and is connected to the front bolster 2 through the medium of a fifth wheel comprising sections 4 and $4^a$, respectively rigid with frame $3^a$ and bolster 2. Extending through frame $3^a$ and sections 4 and $4^a$ is a king bolt 5. Front and rear load-carrying axles 6 and $6^a$ of the arched type are mounted on the axle frame and have wheels 7 journaled thereon. The front axle has the king bolt 5 extending therethrough and also is located within a slot 8 of section 4, while the rear axle is located within a groove 9 of beam $2^b$.

Depending pairs of arms 10 are formed on the ends of the axle frames and the arms of each pair are connected by a rod 11 on which coil springs 12 are located. Movable arms 13 are arranged between the arms carried by the axle frames and are provided with slots 14 to receive or permit the rods 11 to extend therethrough and the movable arms are engaged on opposite faces by the coil springs for the purpose of keeping the movable arms centered between the arms of the axle frames. The upper ends of the movable arms are journaled on supporting rods 15 carried by the axle frames and extend parallel therewith. The front supporting rod is provided with an opening to permit the king bolt to extend therethrough and the latter after extending through the opening of the supporting rod has a coil spring 16 mounted thereon and retained thereon by a nut 17.

Draft axles 17 are secured to the lower ends of the movable arms 13 and have journaled on their ends draft delivering rollers or wheels 18 that are disposed over the fellies of the wheels and are normally spaced a slight distance from the fellies of the wheels when there is not draft applied to the axles. A reach pole 19 is pivoted to the front draft axle as shown at 20 and the rear portion of the reach pole is bifurcated to form spaced arms 21 which are connected to the rear draft axle by clamps 22 to cause a delivery of draft power from the front axle to the rear axle when the draft power is applied to the front axle. The draft rollers are provided with grooves 24 to engage annular tracks 25 formed on the peripheries of the load carrying wheels 4 to prevent the rollers from moving laterally in respect to the wheels 4.

A draft medium 26 which may be in the form of a tongue is connected to the draft axles so that the draft power or source may be connected to the front draft axle.

In operation, as soon as a draft power is applied to the draft axles, they move forwardly bringing the draft rollers into engagement with the peripheries of the wheels 4 beyond the vertical axes of said wheels 4 and below the horizontal axes of the wheels 4, for the purpose of causing the wheels 4 to rotate easier with a less expenditure of draft power than is required to move a truck or wagon of the ordinary construction and of the same weight. As soon as the draft is discontinued on the draft axles, the same return automatically to their initial positions by the springs 12, which brings the rollers 18 out of engagement with the peripheries of the wheels 4.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A running gear for vehicles including an axle, wheels journaled thereon, a frame for said axle, said axle being arched to accommodate compact disposition of the frame, an arm pivoted to the frame, an axle carried by the arm, and rollers on the axle engageable with the fellies of the wheel below their axis of rotation and in advance of a vertical line passing through said axis.

2. A running gear for vehicles including wheels, an arm, a frame to which said arm is pivoted, an axle carried by said arm, and rollers on said axle engageable with the felly of the wheel in advance below their axis of rotation and in advance of a vertical line passing through said axis, means of connection between said arm and the draft means of the running gear whereby the rollers will be applied to the wheels through actuation of the running gear, and resilient means associated with said arms to normally maintain said rollers disengaged from the wheels.

3. A running gear for vehicles comprising axle frames, load axles carried by the frames, wheels journaled to the axles, arms pivoted to said frames, draft axles carried by said arms, rollers journaled to said draft axles and adapted to engage the fellies of the wheels beyond the vertical axes of the latter when draft power is applied to the draft axles, and tension means engaging the arms.

4. A running gear for vehicles comprising axle frames, load carrying axles mounted on the frames, wheels journaled to the axles, arms pivoted to the frames, stationary arms carried by said frames and having the pivoted arms arranged therebetween, tension means between the stationary arms and the pivoted arms, draft axles carried by the pivoted arms, and rollers journaled to the draft axles and normally disengaged from the fellies of the wheels and adapted on the application of draft power to said draft axles to engage the fellies of the wheels beyond the vertical axes of the latter.

In testimony whereof I affix my signature in presence of two witnesses.

CHARLES H. COPP.

Witnesses:
H. H. SHINN,
S. C. GLARUM.